U.S. Patent Office
3,531,524
Patented Sept. 29, 1970

3,531,524
N-CARBOXYACYL-N'-POLYCHLOROALKYLTHIO CARBODIIMIDES
Melancthon S. Brown, Berkeley, Calif., assignor to Chevron Research Company, San Francisco, Calif., a corporation of Delaware
No Drawing. Continuation of application Ser. No. 648,976, June 26, 1967. This application July 30, 1969, Ser. No. 846,273
Int. Cl. C07c *103/30*
U.S. Cl. 260—558
3 Claims

ABSTRACT OF THE DISCLOSURE

N-carboxyacyl - N' - polychloroalkylthio carbodiimides in which the carboxyacyl group is alkanoyl of 2 to 10 carbon atoms or monocyclic aroyl of 7 to 10 carbon atoms and the polychloroalkyl group is of 1 or 2 carbon atoms and 3 to 5 chlorine atoms, at least one of which is bonded to the alpha carbon atom of the alkyl group. They are made by reacting a sulfenyl halide with an alkali metal salt of a carboxyacyl cyanamide. Carbodiimides of this group are fungicidal and may be used as chemical intermediates.

CROSS REFERENCE TO RELATED APPLICATIONS

This application is a continuation-in-part of application Ser. No. 648,976, filed June 26, 1967.

FIELD OF INVENTION

This invention concerns N-carboxyacyl-N'-polychloroalkylthio carbodiimides and their preparation.

INVENTION DESCRIPTION

The carbodiimides of this invnvention are of the formula:

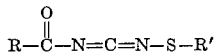

in which R is alkyl of 1 to 10 carbon atoms or phenyl substituted with 0 to 2 alkyl of 1 to 3 carbon atoms, alkoxy of 1 to 3 carbon atoms, halogen of atomic number 9 to 35 (i.e., F, Cl and Br), alkylthio of 1 to 3 carbon atoms, nitro, cyano or dialkylamino in which the alkyls are of 1 to 3 carbon atoms each and R' is a polychloroalkyl group of 1 or 2 carbon atoms and 3 to 5 inclusive chlorine atoms, at least one of which is bound to the alpha carbon atom of the alkyl. Where the alkyl of the above-mentioned polychloroalkyl group is methyl, there will, of course, be 3 chlorines present in the group. Where R represents phenyl substituted with 2 groups, the substituent groups may be the same or different. The alkyl groups of the dialkylamine substituents may be the same or different. Alkyl radicals of 3 or more carbon atoms represented by R may be straight-chained or branched. Preferred carbodiimides represented by the above formula are those in which R is phenyl, monochlorophenyl, mononitrophenyl or alkyl of 1 to 3 carbon atoms and R' is trichloromethyl or 1,1,2,2-tetrachloroethyl.

Polychloroalkyl groups represented by R' include trichloromethyl, 1,2,2-trichloroethyl, 1,1,2-trichloroethyl, 1,1,2,2-tetrachloroethyl and 1,2,2,2 - tetrachloroethyl.

Alkyl groups represented by R include methyl, ethyl, n-amyl, 2-methylbutyl, n-hexyl, 3-ethylhexyl, n-heptyl, 4-methylethyl, n-propyl, isopropyl, n-butyl, sec.butyl, tert.butyl, n-amyl, 2-methylbutyl, n-hexyl, 3-ethylhexyl, n-heptyl, 4-methylhexyl, n-octyl, n-nonyl and n-decyl. Substituted phenyl groups represented by R include o-, p- and m-chlorophenyl, o-, p- and m-bromophenyl, o-, m- and p-fluorophenyl, all the dichlorophenyl, dibromophenyl and difluorophenyl position isomers, all the bromochlorophenyl, chlorofluorophenyl and bromofluorophenyl position isomers, o-, m- and p- nitrophenyl, all the dinitrophenyl position isomers, o-, m- and p-cyanophenyl, all the dicyanophenyl position isomers, o-, m- and p-tolyl, o-, m- and p-xylyl, o-, m- and p-ethylphenyl, o-, m- and p-propylphenyl, all the ethyltolyl position isomers, all the propyltolyl position isomers, all the chlorotolyl, bromotolyl and fluorotolyl, nitrotolyl, cyanotolyl, dimethylaminotolyl, diethylaminotolyl, dipropylaminotolyl, methylethylaminotolyl, methylpropylaminotolyl and ethylpropylaminotolyl position isomers, all the ethylpropylphenyl position isomers, o-, m- and p-methoxyphenyl, o-, m- and p-ethoxyphenyl, o-, m- and p-propoxyphenyl, o-, m- and p-methylthiophenyl, o-, m- and the various di(dialkylamino)phenyl position isomers in which the alkyls are of 1 to 3 carbon atoms each, all the various position isomers of chloronitrophenyl, bromonitrophenyl, fluoronitrophenyl, alkoxynitrophenyl in which the alkyl is of 1 to 3 carbon atoms, alkylthionitrophenyl in which the alkyl is of 1 to 3 carbon atoms, cyanonitrophenyl and dialkylaminonitrophenyl in which each alkyl is of 1 to 3 carbon atoms, all the chlorocyanophenyl, bromocyanophenyl and fluorocyanophenyl position isomers, all the cyanoethylphenyl position isomers, all the cyanopropylphenyl position isomers, all the various position isomers of alkoxycyanophenyl in which the alkyl is of 1 to 3 carbon atoms, all the various position isomers of alkylthiocyanophenyl in which the alkyl is of 1 to 3 carbon atoms, all the position isomers of cyanodialkylaminophenyl wherein each alkyl is of 1 to 3 carbon atoms, all the position isomers of chlorodialkylaminophenyl, bromodialkylaminophenyl and dialkylaminofluorophenyl in which each alkyl is of 1 to 3 carbon atoms, all the position isomers of ethyldialkylaminophenyl in which each alkyl is of 1 to 3 carbon atoms, dialkylaminopropylphenyl in which each alkyl is of 1 to 3 carbon atoms, all the various position isomers of dialkoxyphenyl in which the alkyl is of 1 to 3 carbon atoms, all the various position isomers of dialkylthiophenyl in which the alkyl is of 1 to 3 carbon atoms, all the position isomers of chloroalkoxyphenyl, bromoalkoxyphenyl and fluoroalkoxyphenyl in which the alkyls are of 1 to 3 carbon atoms, all the position isomers of alkylthiochlorophenyl, alkylthiobromophenyl and alkylthiofluorophenyl in which the alkyls are of 1 to 3 carbon atoms, o-, m- and p-alkoxytolyl in which the alkyl is of 1 to 3 carbon atoms, o-, m- and p-alkylthiotolyl in which the alkyl is of 1 to 3 carbon atoms, all the position isomers of alkoxyethylphenyl, alkoxypropylphenyl, alkylthioethylphenyl and alkylthiopropylphenyl in which the alkyls are of 1 to 3 carbon atoms, the position isomers of alkoxyalkylthiophenyl in which each alkyl is of 1 to 3 carbon atoms, the position isomers of alkoxydialkylaminophenyl in which each alkyl is of 1 to 3 carbon atoms and the position isomers of alkylthiodialkylaminophenyl in which each alkyl is of 1 to 3 carbon atoms.

Exemplary compounds of this invention are N-acetyl-N'-trichloromethylthio carbodiimide, N-butyryl-N'-1,1,2,2-tetrachloroethylthio carbodiimide, N-hexanoyl-N'-trichloromethylthio carbodiimide, N-octanoyl-N'-1,1,2,2-tetrachloroethylthio carbodiimide, N - decanoyl - N' - trichloromethylthio carbodiimide, N-benzoyl-N'-tribromoethylthio carbodiimide, N - p-chlorobenzoyl - N' - pentachloroethylthio carbodiimide, N-p-bromobenzoyl-N'-1,2,2-tetrachloroethylthio carbodiimide, N-toluoyl-N'-1,2,2-trichloroethylthio carbodiimide, N - 2,4 - dichlorobenzoyl-N' - trichloromethylthio carbodiimide, N - 3,5 - dinitrobenzoyl - N' - 1,2 - dibromo - 2,2 - dichloroethylthio carbodiimide, N - 3 - bromo - 4 - toluoyl - N' - 1,1,2,2- tetrachloroethylthio carbodiimide, N - 4 - propylbenzoyl-N' - carbodiimide, N - p - cyanobenzoyl - N' - 1,1,2,2-tetrachloroethylthio carbodiimide, N - 2,4 - diethylbenzoyl - N' - 1,2, - trichloroethylthio carbodiimide, N - 3,5-diethylbenzoyl - N' - trichloromethylthio carbodiimide, N - p - diethylaminobenzoyl - N' - 1,2,2,2 - tetrachloroethylthio carbodiimide, N - 3,5 - di - (dipropylamino) benzoyl - N' - trichloromethylthio carbodiimide, N - m - bromobenzoyl - N' - 1,2,2 - trichloroethylthio carbodiimide, N - m - methylthiobenzoyl - N' - trichloromethylthio carbodiimide, N - 2,4 - dipropylthiobenzoyl - N' - 1,1,2,2 - tetrachloroethylthio carbodiimide, N - 3,5 - difluorobenzoyl - N' - 1,1,2,2 - tetrachloroethylthio carbodiimide, N - 2,5 - diproproxybenzoyl - N' - 1,2,2,2-tetrachloroethylthio carbodiimide, N - 4 - cyano - 2 - toluoyl - N' - 1,1,2,2 - tetrachloroethylthio carbodiimide, N - p - fluorobenzoyl - N' - 1,1,2,2 - tetrachloroethylthio carbodiimide, N - 2 - chloro - 4 - isopropoxybenzoyl - N'-trichloromethylthio carbodiimide, N - 3 - nitro - 5 - methylthiobenzoyl - N' - 1,1,2,2 - tetrachloroethylthio carbodiimide, N - 3 - bromo - 5 - dimethylaminobenzoyl-N' - 1,1,2,2 - tetrachloroethylthio carbodiimide and N - m - nitrobenzoyl - N' - 1,1,2 - trichloroethylthio carbodiimide.

Carbodiimides of this invention may be made by reacting a suitable polychloroalkylsulfenyl halide, preferably a chloride, with an alkali metal salt of a carboxyacyl cyanamide. This reaction is illustrated by the following equation:

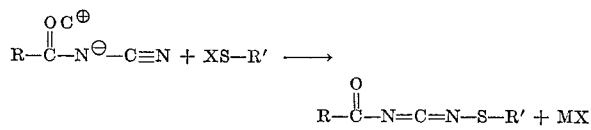

wherein R and R' are as defined previously and X is halogen, e.g., Cl or Br, and M is alkali metal.

Desirably, this reaction is carried out in an aqueous medium at temperatures in the range of 0 to 50° C. The aqueous medium may comprise water or mixtures of water and relatively inert water-miscible organic solvents such as dioxane, dimethoxyethane and dimethylformamide. The alkali metal salt of the carboxyacyl cyanamide may be prepared in situ by adding the carboxyacyl cyanamide to an alkali metal hydroxide in the reaction vessel. Or, the salt can be prepared in a like manner prior to reaction and added to the reaction vessel. The relative proportions of the reactants are not critical. Proportions approximating stoichiometric amounts will usually be employed.

The carbodiimides of this invention will hydrolyze to corresponding ureas in the presence of water. The rate of hydrolysis depends primarily upon the nature of the hydrocarbyl group (R' in the above formula) and the conditions under which the carbodiimide contacts the water. For instance compounds in which R' is trichloromethyl or 1,1,2,2-tetrachloroethyl are relatively stable in the presence of water. Other compounds are less stable and rapidly hydrolyze under mild conditions in the presence of water.

The stable carbodiimides of this invention are crystalline solids. Thus, they may be isolated from the reaction mixture by conventional methods such as filtration. They may be purified by washing with organic solvents and by recrystallization from organic solvents such as chloroform, acetone, benzene, etc.

The carboxyacyl cyanamides utilized in the preparation of the carbodiimides of this invention are a well known class of compounds. The simple ones such as acetyl, butyryl and benzoyl were prepared and characterized in 1890 [Z. Phys. Chem. 6, 304 (1890)]. The carboxyacyl cyanamides, also known in the chemical literature as N-cyanocarboxamides or acylcyanamides, are readily prepared by the reaction of cyanamide or a cyanamide salt and a carboxylic acid halide or anhydride. The preferred method is by the reaction of sodium cyanamide and an acid halide in an aqueous medium, e.g.,

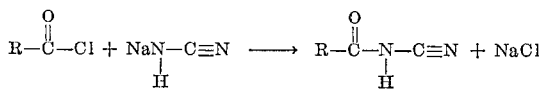

wherein R is as defined previously.

The acid halides and anhydrides needed for this reaction are also well known classes of compounds. Essentially all organic carboxylic acids can be converted to the acid halide by reaction with thionyl chloride, or with the phosphorous halides, e.g., phosphorous pentachloride (Ref. "Reactions of Organic Compounds" 2nd Ed., by W. J. Hickinbottom, Longmans, Green and Co., 1948, page 224). Acid anhydrides are readily made by the reaction of equimolar amounts of the acid and the acid halide (same ref.). As described above the aryl groups represented by R may be substituted nuclearly with up to 2 functional groups such as alkyl, alkoxy, alkylthio, nitro, dialkylamino and halogens. The position of these functional groups on the benzene nucleus is such that there is no steric hindrance of the carboxy group. In general, it is advisable to avoid large, bulky groups in both ortho positions of the arylcarboxy acid starting materials. All such acid halides or anhydrides readily react with cyanamide or with cyanamide salts to produce the carboxyacyl cyanamides needed for the preparation of the carbodiimides of this invention.

The preferred way to prepare the carboxyacyl cyanamides from any of the above-described carboxy acid halides involves the slow addition of said acid halide to a cold (preferably at or below room temperature) solution of sodium cyanamide. This sodium cyanamide solution is prepared by simply dissolving cyanamide in an equimolar amount of aqueous sodium hydroxide. Other salts may also be used, as for example the potassium or calcium salts. Generally an aqueous system is employed both for convenience and for cheapness. However, other media may be used, e.g., aprotic polar solvents such as dimethyl formamide, diethyl ether, dioxane, etc.

After the acid halide has been added, the resulting solution is often allowed to react for an additional period of time, e.g., up to about 24 hours longer. Then the product acylcyanamide is recovered. Recovery may be by any of the usual techniques of filtration, extraction, evaporation, etc. With aqueous systems, it is frequently desirable to filter off any insolubles and then acidify to precipitate the acylcyanamide which is collected by filtration. With nonaqueous systems, the product can be recovered by evaporation after filtering off any insoluble inorganic salt by-products.

In most cases when preparing the N-carboxyacyl-N'-hydrocarbylthio carbodiimides of the present invention, the carboxyacyl cyanamide intermediate can be conveniently left in the reaction mixture solution and used as such without separation. This is preferably the case when an aqueous medium was employed in the production of the acylcyanamide. The pH of the reaction mixture is adjusted to be on the basic side, and then the hydrocarbylthio halide is added slowly.

Carbodiimides of this invention have exhibited fungicidal activity. For instance, N-benzoyl-N'-1,1,2,2-tetrachloroethylthio carbodiimide was effective against fungi such as Pythium, Helminthosporium, Rhizoctonia, Monolinia and Alternaria. As fungicides they may be mixed with suitable diluents in fungicidal amounts and applied by conventional means and methods to fungi or hosts susceptible to fungus attack. They are also useful chemical intermediates and may be reacted with water to form the corresponding di-substituted ureas—which are fungicidal.

The following examples illustrate the preparation of the acylcyanamide intermediates and the carbodiimides of this invention. These examples are offered as illustrative and are in no way meant to limit the invention described herein. Unless otherwise indicated, percentages are by weight.

Example 1.—(Preparation of acetyl cyanamide)

Sodium cyanamide, 20 g. was mixed with 200 ml. of diethyl ether. To this mixture there was added 24 g. of acetyl chloride dissolved in 20 ml. of diethyl ether. The addition required 10 minutes during which time there was gentle reflux of the ether. The reaction mixture was stirred for an additional 3 hours. The insoluble salt was removed by filtration, and the filtrate was evaporated to give 16.5 g. acetyl cyanamide.

Example 2.—(Preparation of benzoyl cyanamide)

Calcium cyanamide, 200 g. was dissolved in 1 liter of water and cooled in an ice bath. To this solution there was slowly added 50 ml. of benzoyl chloride. After all had been added, the solution was stirred at 20° C. for 18 hours. The insoluble portion was removed by filtration. This insoluble cake was reslurried with 250 ml. of water, and filtered again. Then the cake was washed with 100 ml. of water. The wash and reslurry waters were added to the first filtrate which was then cooled. Calcium chloride, 200 g. was added to the cold solution. The resulting precipitate was recovered by filtration and then redissolved in 200 ml. of water. After filtration to remove trace insolubles, the aqueous solution was acidified with dilute hydrochloric acid. The solution was cooled in an ice bath during this acidification step. The precipitate was collected by filtration, washed with water, and then dried to give 15 g. of benzoyl cyanamide.

Example 3.—(Preparation of p-chlorobenzoyl cyanamide)

A 1-liter 3-necked flask was fitted with a stirrer, a thermometer, and a condenser. It was charged with 80 g. of 50% sodium hydroxide and 500 ml. of water and then cooled to 5° C. To this solution there was added 84 g. of an aqueous 50% solution of cyanamide over a period of 15 minutes. The cooling bath was removed and 87.5 g. of p-chlorobenzoyl chloride were added slowly. The reaction mixture was stirred for 2 more hours and then filtered. The resulting cake was washed with a small amount of water and then with ether. The cake was then dried to give 35 g. of the sodium salt of p-chlorobenzoyl cyanamide.

Example 4.—(Preparation of N-benzoyl-N'-,1,2,2-tetrachloro-ethylthio carbodiimide)

Essentially the same procedure as Example 3 was followed, except that 93 g. of p-nitrobenzoyl chloride was added to the sodium cyanide solution. After the usual markup, 106 g. of the sodium salt of p-nitrobenzoyl cyanamide was recovered. The free acyl cyanamide was obtained by adding hydrochloric acid to an aqueous solution of a portion of the sodium salt.

Example 5.—(Preparation of N-benzoyl-N'-1,1,2,2-tetrachloroethylthio carbodiimide)

9.0 g. of 50% sodium hydroxide and 250 ml. of ice water were mixed in a blender. 14 g. of benzoyl cyanamide were added to this mixture and blended for about 1 minute. 22.50 g. of 1,1,2,2-tetrachloroethylsulfenyl chloride were added to the blender, and the combined mixture was blended for about 10 minutes. A solid precipitate formed. This precipitate was filtered from this reaction mixture and washed with ice water and hexane to give a white, granular solid. This white, granular solid was taken up in chloroform, dried and stripped of solvent to give an oily material weighing 23 g. This oily material was dissolved in a mixture weighing 23 g. This oily material was dissolved in a mixture of benzene and hexane and cooled to give 16.3 g. of N-benzoyl-N'-1,1,2,2-tetrachloroethylthio carbodiimide. This compound melted at 79–82° C. and had the following analyses: S, calculated: 9.30%, found: 9.33%; Cl, calculated: 41.2%, found: 40.65%. Infrared analysis of this compound showed a peak at 4.6 m$\mu$. This analysis and the ease with which this compound hyrolyzed to a urea are indicative of the carbodiimide structure.

In a manner similar to that described in Example 5 other N-carboxyacyl-N'-polychloroalkylthio carbodiimides were prepared. These compounds and their analyses are listed in Table I.

TABLE I

| Compound | S | | Cl | |
|---|---|---|---|---|
| | Calcd. | Found | Calcd. | Found |
| Example: | | | | |
| 6 ............ N-benzoyl-N'-perchloromethylthio carbodiimide ..................... | 10.82 | 10.60 | 36.02 | 35.35 |
| 7 ............ N-p-chlorobenzoyl-N'-1,]2,2-tetrachloroethylthio carbodiimide ....... | 8.45 | 8.36 | 46.6 | 45.6 |
| 8 ............ N-p-chlorobenzoyl-N'-perchloromethylthiocarbodiimide ............. | 9.7 | 9.95 | 43.0 | 41.62 |
| 9 ............ N-p-nitrobenzoyl-N'-perchloromethylthio carbodiimide ............. | 9.38 | 9.43 | 31.1 | 30.65 |
| 10 ........... N-acetyl-N'-1,1,2,2-tetrachloroethylthio carbodiimide .............. | 11.35 | 11.35 | 50.3 | 47.2 |

I claim:
1. A compound of the formula

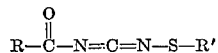

in which R is alkyl of 1 to 10 carbon atoms, phenyl or phenyl substituted with 1 to 2 substituents selected from the group consisting of alkyl of 1 to 3 carbon atoms, alkoxy of 1 to 3 carbon atoms, alkylthio of 1 to 3 carbon atoms, halogen of atomic number 9 to 35, nitro, cyano or dialkylamino in which the alkyls are of 1 to 3 carbon atoms each and R' is a polychloralkyl group of 1 to 2 carbon atoms and 3 to 5 chlorine atoms, at least one of which is bound to the alpha carbon atom of the alkyl of the polychloroalkyl group.

2. The compound of claim 1 wherein R' is trichloromethyl or 1,1,2,2,-tetrachloroethyl.

3. The compound of claim 2 wherein R is alkyl of 1 to 3 carbon atoms, phenyl, p-chlorophenyl or p-nitrophenyl.

References Cited

Bredereck et al.: Berichte, vol. 81, pp. 426–38 (1948).

HENRY R. JILES, Primary Examiner

H. I. MOATZ, Assistant Examiner

U.S. Cl. X.R.

260—453, 465, 553, 559, 561; 424—304, 320, 324, 399